US012573877B2

(12) United States Patent
Harper et al.

(10) Patent No.: US 12,573,877 B2
(45) Date of Patent: Mar. 10, 2026

(54) CONDUCTOR ROUTING IN HIGH ENERGY WIRELESS POWER TRANSFER PADS

(71) Applicant: Wireless Advanced Vehicle Electrification, LLC, Salt Lake City, UT (US)

(72) Inventors: Marcellus Harper, Kaysville, UT (US); Adeel Zaheer, West Valley, UT (US); Kelly Wardell, Stansbury Park, UT (US)

(73) Assignee: Wireless Advanced Vehicle Electrification, LLC, Salt Lake City, UT (US)

( * ) Notice: Subject to any disclaimer, the term of this patent is extended or adjusted under 35 U.S.C. 154(b) by 970 days.

(21) Appl. No.: 17/723,378

(22) Filed: Apr. 18, 2022

(65) Prior Publication Data

US 2023/0336025 A1 Oct. 19, 2023

(51) Int. Cl.
| | |
|---|---|
| *H02J 50/00* | (2016.01) |
| *B60L 53/12* | (2019.01) |
| *H01F 27/28* | (2006.01) |
| *H02J 50/10* | (2016.01) |
| *H02J 50/70* | (2016.01) |

(52) U.S. Cl.
CPC ............ *H02J 50/005* (2020.01); *B60L 53/12* (2019.02); *H01F 27/2804* (2013.01); *H02J 50/10* (2016.02); *H02J 50/70* (2016.02)

(58) Field of Classification Search
CPC ...... H02J 50/005; H02J 50/70; H01F 27/2828
See application file for complete search history.

(56) References Cited

U.S. PATENT DOCUMENTS

| | | | |
|---|---|---|---|
| 10,148,117 B2 | 12/2018 | Lethellier et al. | |
| 2009/0184679 A1 | 7/2009 | Yeh | |
| 2010/0033236 A1* | 2/2010 | Triantafillou | ......... H01L 23/645 |
| | | | 327/540 |
| 2019/0165474 A1 | 5/2019 | An et al. | |
| 2019/0237248 A1 | 8/2019 | Krammer et al. | |

FOREIGN PATENT DOCUMENTS

WO WO-2022018439 A1 * 1/2022 ........... H01F 27/289

OTHER PUBLICATIONS

PCT Application No. PCT/US2023/018155 filed Apr. 11, 2023, International Search Report and Written Opinion of the International Searching Authority mailed Sep. 19, 2023.

* cited by examiner

*Primary Examiner* — Jack Chiang
*Assistant Examiner* — Aric Lin
(74) *Attorney, Agent, or Firm* — Kunzler Needham & Hilton; Bruce R. Needham

(57) ABSTRACT

Described herein are techniques for routing conductive wires in a wireless power transfer pad. Such techniques may comprise routing, for a length of wiring between a power source and an inductive coil, a first conductive wire configured to carry a first current, routing, for a first portion of the length of wiring, a second conductive wire next to the first conductive wire, wherein the second conductive wire is configured to carry a second current having a direction that is substantially opposite that of the first current, and routing, for a second portion of the length of wiring, a portion of the inductive coil next to the first conductive wire, wherein the portion of the inductive coil is configured to carry a third current having a direction that is substantially opposite that of the first current.

20 Claims, 10 Drawing Sheets

600

400

402

404

900

902

1000

ROUTING A FIRST CONDUCTIVE WIRE CONFIGURED TO CARRY A FIRST CURRENT
1002

ROUTING, FOR A FIRST PORTION, A SECOND CONDUCTIVE WIRE NEXT TO THE FIRST CONDUCTIVE WIRE CARRYING A CURRENT OPPOSITE THE FIRST CONDUCTIVE WIRE
1004

ROUTING, FOR A SECOND PORTION, A PORTION OF THE INDUCTIVE COIL NEXT TO THE FIRST CONDUCTIVE WIRE CARRYING A CURRENT OPPOSITE THE FIRST CONDUCTIVE WIRE
1006

CONDUCTOR ROUTING IN HIGH ENERGY WIRELESS POWER TRANSFER PADS

GOVERNMENT SUPPORT CLAUSE

This invention was made with government support under contract DE-EE0008360 awarded by the Department of Energy. The government has certain rights in the invention.

BACKGROUND

As the world becomes more aware of the impact that the use of fossil fuels is having on the environment, the demand for environmentally friendly alternatives is increasing. In the realm of transportation, vehicles that are powered by fossil fuels are being replaced by alternatives including partially or fully electric vehicles. In some cases, entire fleets of vehicles, such as busses, are being replaced by electric vehicles. However, despite this increase in popularity, electric vehicles are subject to their own unique set of problems. For example, the range of an electric vehicle is often dependent upon the amount of charge that can be, or is, stored in a battery of that vehicle. This can be, and typically is, mitigated via the use of electric charging stations that may be embedded within roadways. For example, in the case of an electric bus, such electric charging stations may be placed throughout a transit route that is traversed by the bus (e.g., at bus stops) to provide periodic recharging for the bus.

However, wireless power transfer, sometimes referred to as inductive charging, may also produce field radiation that may be harmful to people. Various standards exist to limit the emission of harmful radiation. For example, the ICNIRP 2000 standard dictates the amount of flux density units that may be generated by a charging plate in such a charging station. The emission of harmful radiation is typically managed via the use of shielding (e.g., ferrite plates). However, charging stations often require maintenance, making accessibility of the electronics within those charging stations paramount. It can be somewhat difficult to implement sufficient shielding to reduce the emission of harmful radiation while providing a charging plate having ease of access. Hence, managing the emission of harmful radiation within a charging station may come at the cost of providing accessibility of electronics within that charging station.

SUMMARY

Techniques are provided herein for routing conductive wiring within a wireless power transfer pad in a manner that reduces the emission of harmful radiation while facilitating easy access to the routed wiring. In such techniques, wires carrying current in opposite directions may be paired (e.g., placed in proximity) along some length such that electromagnetic field (EMF) radiation emitted via current traveling through the wires are at least partially canceled out.

In some embodiments, the techniques pertain to routing of a length of conductive wiring between a power source and an inductive coil. The length of wiring may run between an inductive coil and a respective charging area and may be unshielded. In some cases, the conductive wire may connect to the inductive coil via one or more terminals located in an interior area of (e.g., within) the inductive coil. Each of the wires in the length of wiring may be paired with another wire having a current that is equal and opposite in order to provide active shielding of the wires in the length of wiring.

In one embodiment a method of routing conductive wires in a wireless power transfer pad is disclosed, the method comprising routing, for a length of wiring between a power source and an inductive coil, a first conductive wire configured to carry a first current, routing, for a first portion of the length of wiring, a second conductive wire next to the first conductive wire, wherein the second conductive wire is configured to carry a second current having a direction that is opposite that of the first current, and routing, for a second portion of the length of wiring, a portion of the inductive coil next to the first conductive wire, wherein the portion of the inductive coil is configured to carry a third current having a direction that is opposite that of the first current.

An embodiment is directed to a power transfer pad comprising a first conductive wire configured to carry a first current for a length of wiring between a power source and an inductive coil, a second conductive wire routed next to the first conductive wire for a first portion of the length of wiring, wherein the second conductive wire is configured to carry a second current having a direction that is opposite that of the first current, and a portion of the inductive coil routed next to the first conductive wire for a second portion of the length of wiring, wherein the portion of the inductive coil is configured to carry a third current having a direction that is opposite that of the first current and is interior to the pad outline but is still routed close enough to cancel magnetic field generated via the first current.

An embodiment is directed to a wiring system comprising an inductive coil comprising at least one loop of wire that, when powered, is configured to generate a magnetic field within a charging area, a terminal connector in communicative contact with the inductive coil, and a set of send and receive wires running a length between a power source and the terminal connector, individual wires in the set of send and receive wires being paired with another wire in the set of send and receive wires over a first portion of the length, and individual wires in the set of send and receive wires being paired with a portion of the inductive coil over a second portion of the length.

The foregoing, together with other features and embodiments will become more apparent upon referring to the following specification, claims, and accompanying drawings. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

This disclosure is directed towards techniques for routing one or more conductive wires within a wireless charging plate. Such techniques may provide for routing the conductive wire in a manner that minimizes and/or reduces an emission of radiation, including harmful radiation, while making the conductive wire accessible for maintenance.

In some embodiments, the techniques involve pairing wires having current of opposite direction along the length of wiring in order to provide field cancellation from radiation emission. In such techniques, various send and receive conductive wires may be routed to a central area of the charging plate and then split off to power a number of loops of an inductive coil. The send and receive conductive wires may be routed above the inductive coil (e.g., between the inductive coil and a charging area).

In the techniques, the send and receive wiring is paired for a first portion of the length of wiring (e.g., from a power source to a central area of the charging plate). Each of the send or receive wires is then paired with a corresponding portion of the inductive coil along a second portion of the length of wiring (e.g., from the central area of the charging plate to one or more terminal connectors).

While shielding may typically be used to prevent the emission of radiation, that same shielding may also reduce the power transmission capabilities of a charging plate. Hence, where the length of wire is located above the inductive coil (i.e., between the inductive coil and a charging area), the length of wire may need to be unshielded, making mitigation of radiation emission in such cases difficult.

In some cases, wiring may be placed under the inductive coil (e.g., below a ferrite slab or other shield) in order to reduce the emission of radiation. However, in such cases, the wiring is made inaccessible (or at least difficult to access). Additionally, in such cases, the wiring must pass through the shielding to connect to the inductive coil. Hence, the shielding must be punctured, which can result in exposure of electronics below to the elements in the case that the charging plate is located outside, such as when it is embedded within a roadway.

Embodiments of the disclosure provide numerous advantages over conventional systems. For example, by routing conductive wiring using the techniques described herein, radiation emission can be mitigated (e.g., reduced or prevented) without the use of a significant amount of radiation shielding and without locating the wiring in an area having low accessibility (e.g., below a ferrite slab). By routing the conductive wiring in the manner described herein, the radiation emitted by such conductive wires is countered and reduced. Hence, embodiments as described herein result in a wiring system that minimizes radiation emission while providing a high level of accessibility for maintenance. Additionally, the system has little impact on the charging capabilities of an inductive coil.

Figure 1:
FIG. 1 illustrates a cross sectional view of a first example charging plate configured to provide wireless transfer of power in accordance with at least some embodiments.
Figure 1:
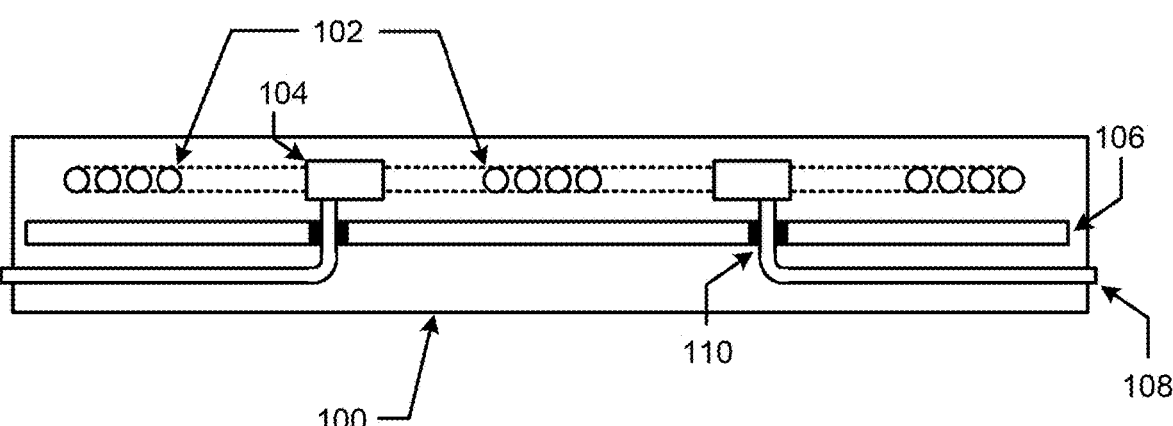

FIG. 1 illustrates a cross sectional view of a first charging plate configured to provide wireless transfer of power. In the depicted exemplary charging plate 100, an inductive charging coil 102 is included that has a number of conductive wires arranged in a loop that is configured to, when powered, emit an electromagnetic field to be used for electric vehicle charging.

In the charging plate 100, an inductive coil 102 may be shaped to form one or more charging loops. For example, the inductive coil may be shaped to form a "figure eight" pattern in which two loops are formed having opposite polarities (e.g., a clockwise loop and a counterclockwise loop). When powered, the inductive coil may be configured to emit electromagnetic field (EMF) radiation that permeates a charging area located above the charging plate. A charging interface of a vehicle located within the charging area may be configured to convert the EMF radiation into an electric charge that is then used to recharge a battery installed within that vehicle. In some cases, the inductive coil may connect to a terminal 104 located within an interior area of (e.g., within) the inductive coil.

It should be noted that EMF radiation generated by the inductive coil in this manner may be emitted in multiple directions. However, such radiation may be blocked/absorbed by shielding 106. Shielding 106 may comprise any suitable material capable of blocking, absorbing and/or redirecting the emitted radiation. For example, the shielding may be a metallic plate, such as a ferrite slab, that is capable of absorbing the emitted radiation.

The inductive coil may be powered via a set of send/receive conductive wires 108 that connect to, and provide power to, the conductive coil via the terminal 104. As would be recognized by one skilled in the art, the send/receive conductive wires may also emit EMF radiation that may be harmful to humans. As depicted in FIG. 1, the set of send/receive conductive wires may be positioned underneath the shielding 106. Alternatively, the set of send/receive conductive wires may be positioned on the same plane as the shielding 106 or between the shielding 106 and the inductive coil 102. This positioning allows for the set of send/receive conductive wires to be routed to the terminal 104 while shielding the charging area (and surrounding areas) from the EMF radiation that may be generated by the send/receive conductive wires. However, when the send/receive conductive wires are positioned in this manner, one or more holes 110 may need to be added to the shielding. This can be problematic for a number of reasons. For example, the integrity of the shielding may be compromised. Additionally, the addition of the hole to the shielding may allow water or other contaminates to make their way into a compartment having the inductive coil or other electronics. Furthermore, the send/receive conductive wires, being located underneath the shielding, may not be easy to access during maintenance operations.

Figure 2:
FIG. 2 illustrates a cross sectional view of a second example charging plate configured to provide wireless transfer of power in accordance with at least some embodiments.
Figure 2:
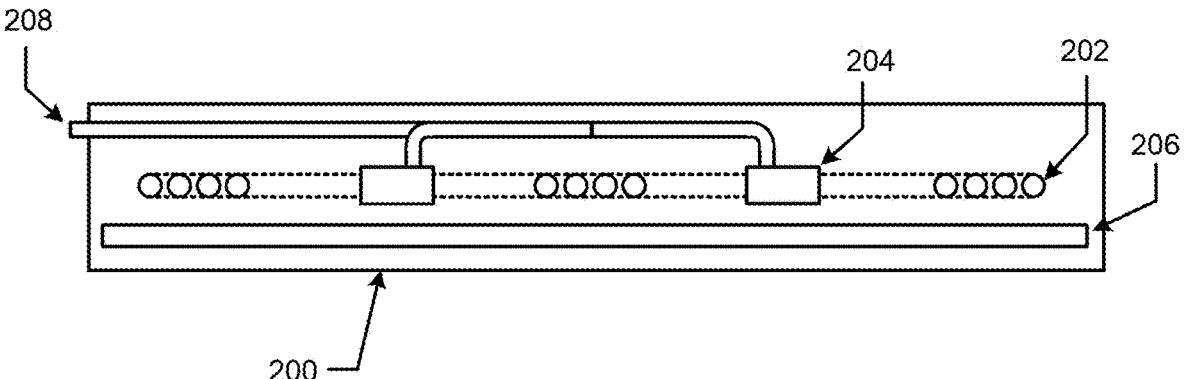

FIG. 2 illustrates a cross sectional view of a second charging plate configured to provide wireless transfer of power. Similar to the first charging plate described with respect to FIG. 1, the depicted exemplary charging plate 200 may also include an inductive charging coil 202 configured to emit an electromagnetic field.

Like the inductive coil 102, the inductive coil 202 may be shaped to form one or more charging loops. In some cases, the inductive coil may connect to a terminal 204 located within an interior area of the inductive coil. Similar to the first charging plate, the second charging plate may also include shielding 206. Likewise, the inductive coil may be powered via a set of send/receive conductive wires 208 that connect to, and provide power to, the conductive coil via the terminal 204.

As depicted in FIG. 2, the send/receive conductive wires 208 may be positioned adjacent to (i.e., above or below) the inductive coil, providing easy access to the send/receive conductive wires for maintenance operations. For example, the send/receive conductive wires 208 may be positioned on an access layer, adjacent to the coil layer, but opposite of the shield. However, as the send/receive conductive wires are not shielded, the charging area above the charging plate may be exposed to any EMF radiation emitted by the send/receive conductive wires. In order to mitigate the emission of EMF radiation, each conductive wire may be paired with another conductive wire that is configured to carry current in an opposite direction along the entire, or substantially entire, length of the conductive wire. It should be noted that by placing the send/receive conductive wires above the shielding, the shielding need not be pierced.

Figure 3:
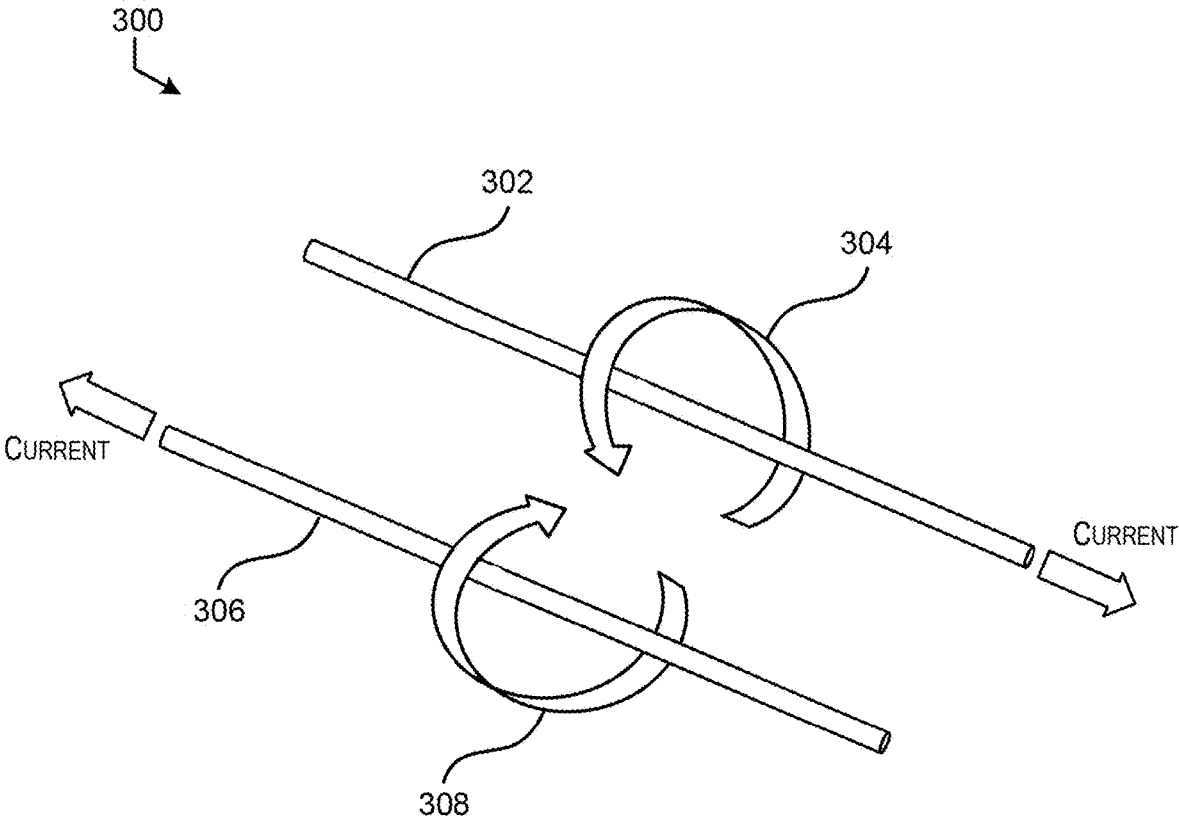
FIG. 3 depicts an illustration of various principles relied upon in accordance with at least some embodiments.

FIG. 3 depicts an illustration of various principles 300 relied upon when implementing embodiments of the techniques described herein. Particularly, the figure illustrates the principle of active shielding, by which magnetic fields may be cancelled out.

As would be recognized by one skilled in the art, when an electric current passes through a conductive wire, it induces a magnetic field that emanates from the conductive wire.

Such a magnetic field can be thought of as a force that has both strength and direction. The direction of such a force is dependent upon a direction of the current within the conductive wire. If the generated magnetic field is met with an equal magnetic field of exactly opposite direction, the two magnetic fields will cancel and the net resulting magnetic field will be zero.

Using these principles, one skilled in the art would understand that if a first current is passed through a first conductive wire 302, a first magnetic field 304 may be generated. The direction and strength of the first magnetic field that is generated is dependent upon the direction and strength of the first current passed through the first conductive wire. In this example, if a second current is passed through a second wire 306, a second magnetic field 308 is generated that is dependent upon the strength and direction of the second current. If the two conductive wires are placed in parallel and in proximity, then each of the respective magnetic fields would have an influence on the other. In the case that the first conductive wire 302 and the second conductive wire 306 are placed in parallel and in close proximity, and if the first current is equal in strength and the opposite direction of the second current, then the respective magnetic fields may at least partially cancel each other out. It should be noted that the degree to which the two magnetic fields cancel each other out may depend upon the proximity of the two conductive wires. The closer that the two wires are placed, the greater degree to which the two respective magnetic fields may be canceled out. It should be noted that two magnetic fields may never be completely canceled out as that would require the two wires to occupy the same space. Accordingly, the use of such techniques may only result in reducing, but never completely nullifying, a magnetic field.

In some cases, it might be beneficial to pair conductive wires that are part of the same circuit, such that a send and receive wire of the circuit are placed in parallel and in proximity. The send and receive wires may be positioned so that the current of the circuit runs in opposite directions along the length of the positioned wires. It should be noted that in some cases, the current in a circuit may be an alternating current in which the direction of the current switches at a predetermined frequency.

Figure 4:
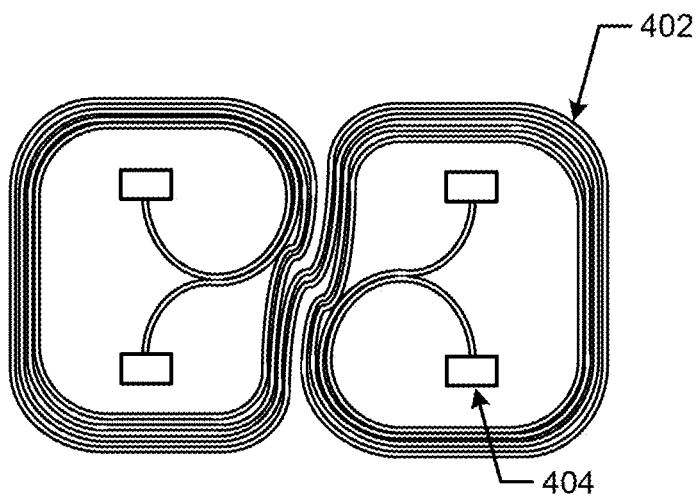
FIG. 4 illustrates an example inductive coil that may be implemented within a charging plate in accordance with at least some embodiments.

FIG. 4 illustrates an exemplary inductive coil 400 that may be implemented within a charging plate in accordance with at least some embodiments. As described elsewhere, the inductive coil 402 may be one or more conductive wires that are positioned to form one or more loops. As depicted in FIG. 4, the one or more conductive wires may be shaped into a figure eight pattern, such that the current in one of the loops runs clockwise and the current in the other loop runs counter-clockwise.

The inductive coil may include a number of terminals 404 that connect the inductive coil to a power source. Each of the number of terminals may be separated by a threshold amount of space. When current is introduced to the inductive coil via the one or more terminals, an electromagnetic field is generated by the inductive coil. The electromagnetic field may be used to transfer power to an electronic device within that electromagnetic field. Note that as pictured the two terminals on the left would each have the same phase and magnitude of current leaving the terminals and would be equal to and opposite the current leaving the two terminals pictured on the right.

Figure 5:
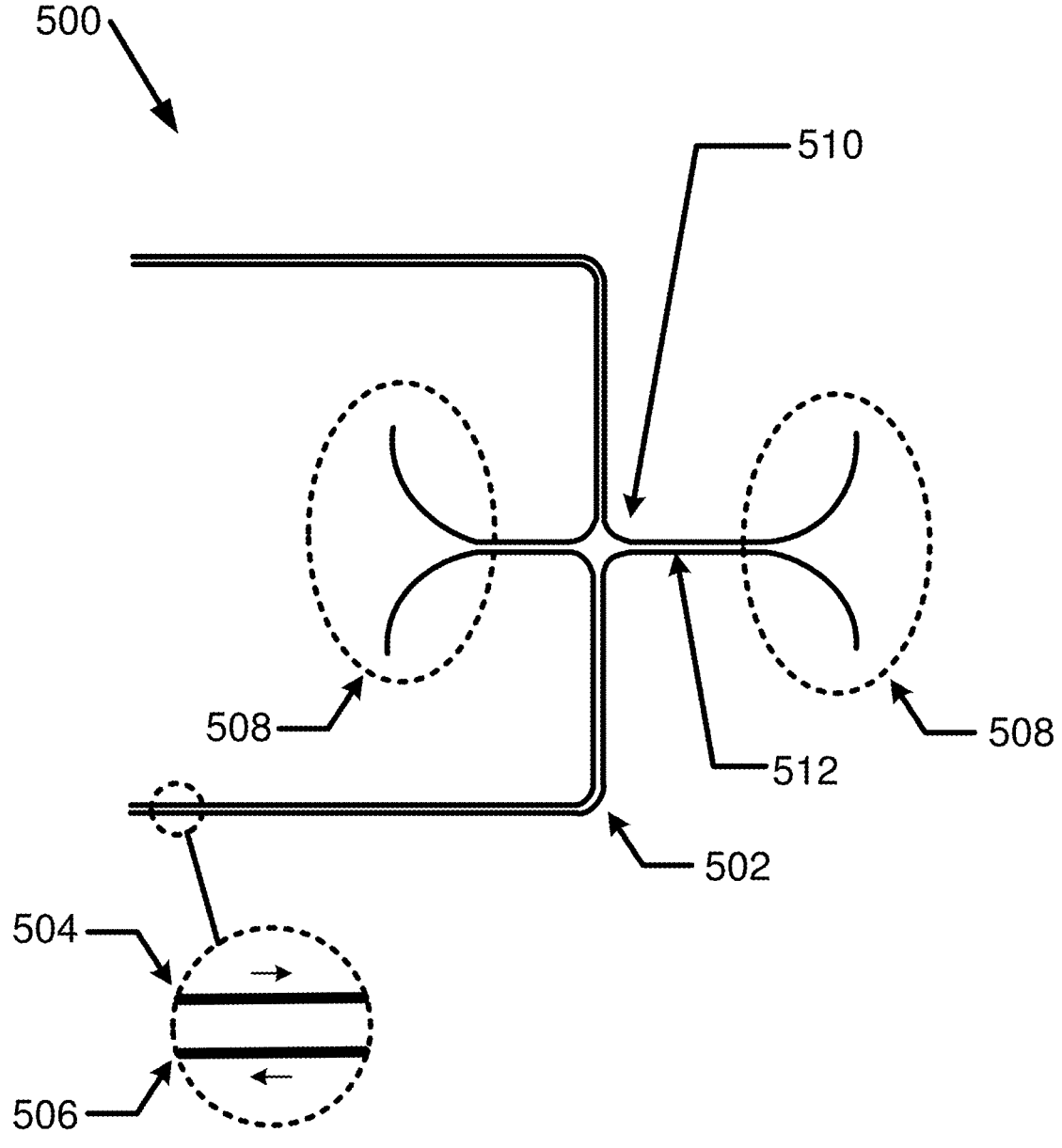
FIG. 5 illustrates a first example set of send/receive conductive wires that may be implemented within a charging plate in accordance with at least some embodiments.

FIG. 5 illustrates a first exemplary set of send/receive conductive wires 500 that may be implemented within a charging plate in accordance with at least some embodiments. As described elsewhere, the set of send/receive conductive wires 502 may include at least one pair of conductive wires that are configured to hold opposite currents. The conductive wires may be paired (e.g., placed in parallel and in proximity) along at least a first portion of the length of the send/receive conductive wires. For example, two respective conductive wires 504 and 506 may be positioned next to each other so that current in each of the wires 504 and 506 runs opposite of one another deep into the interior of the pad (i.e., to a central area of the pad) where stray fields are less of a danger because they are far from the edge of the pad. It should be noted that the pairing of the conductive wires over the first portion of the length of the send/receive conductive wires may act to mitigate or reduce electromagnetic fields generated by the set of conductive wires.

In some embodiments, the set of send/receive wires may separate or diverge for a second portion 508 of the length of the send/receive conductive wires. This may be necessary in order for the send/receive conductive wires to connect to one or more terminals to power an inductive coil.

In some embodiments, the conductive wires in the set of send/receive conductive wires may be routed from a power source to a center 510 of the charging plate before being separated and routed to one or more terminals of an inductive coil. Additionally, the set of send/receive conductive wires 502 depicted may be included in the charging plate positioned on a layer that is separate from a layer on which the inductive coil is included.

As depicted at 512, during a second portion of the send/receive conductive wires routed between the central area of the charging pad and one or more terminals, the send/receive wires may be paired with other send/receive wires that have a matching current. In these cases, each of the send/receive wires may additionally be paired with a portion of the inductive coil (located in a separate layer) that has a current running opposite the second portion of the send/receive wires.

Figure 6:
FIG. 6 illustrates a second example set of send/receive conductive wires that may be implemented within a charging plate in accordance with at least some embodiments.
Figure 6:
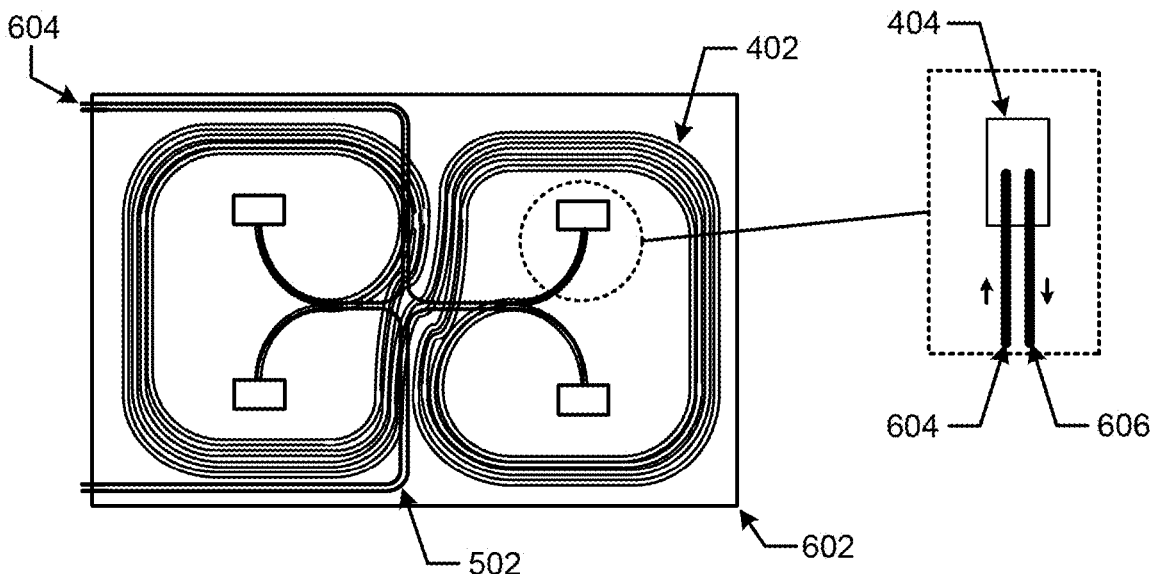

FIG. 6 illustrates a second exemplary set of send/receive conductive wires 600 that may be implemented within a charging plate in accordance with at least some embodiments. Like the first exemplary set of send/receive conductive wires 500 depicted in FIG. 5, the set of send/receive conductive wires 600 may include two respective conductive wires 604 and 606 may be positioned next to each other so that current in each of the wires 604 and 606 runs opposite of one another deep into the interior of the pad (i.e., to a central area).

Unlike the first exemplary set of send/receive conductive wires 500 depicted in FIG. 5, the set of send/receive wires may remain paired for the length of the send/receive conductive wires, until a terminal 608 is reached.

Figure 7:
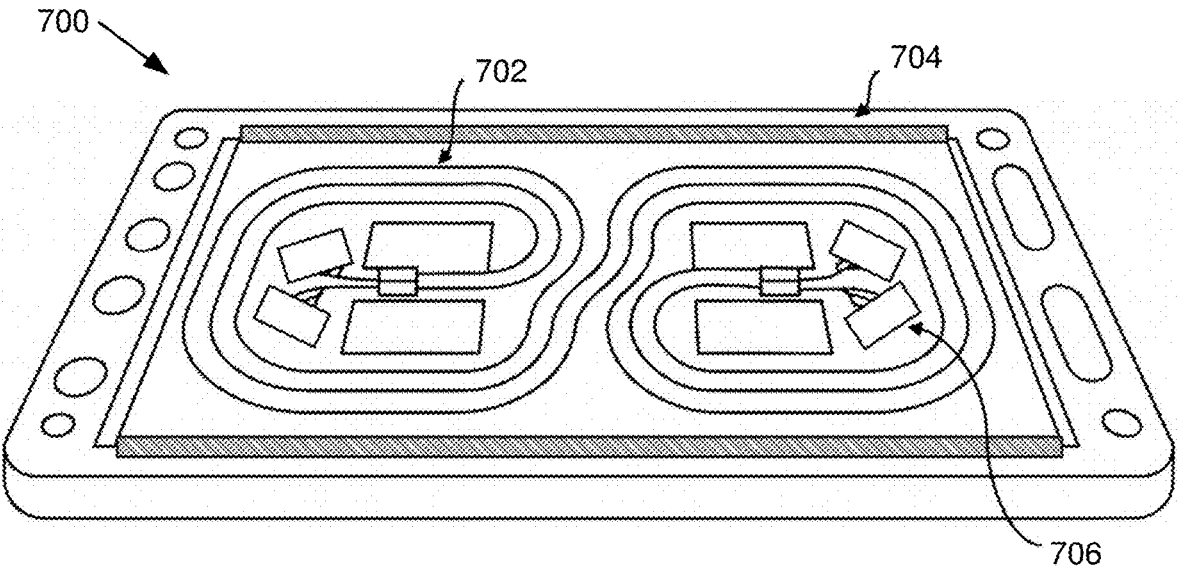
FIG. 7 illustrates an example high-power charging plate that may be implemented in accordance with at least some embodiments.

FIG. 7 illustrates an exemplary high-power charging plate 700 that may be implemented in accordance with embodiments. The charging plate 700 may include an inductive coil 402 as described with respect to FIG. 4 above. Additionally, multiple sets of send/receive conductive wires 502 may be included in the charging plate positioned in a layer that is separate from a layer that includes the inductive coil.

As noted elsewhere, the set of send/receive conductive wires may be differentially paired for a first portion of a length of the set of send/receive conductive wires, be paired with a current running in the same direction for a second portion of a length, and in some embodiments, diverge for a third portion of that length. The third portion of the set of send/receive conductive wires may correspond to a portion of the set of send/receive conductive wires proximate to a terminal 404.

As depicted at 704, over the second portion of the length of the set of send/receive conductive wires, each of the conductive wires may be paired with a corresponding portion of the inductive coil, as depicted in FIG. 6. The second portion of the set of send/receive conductive wires 512 may be positioned in a manner such that a conductive wire from the set of send/receive conductive wires runs proximate, and parallel, to a conductive wire of the inductive coil layer and which carries an equal and opposite current to reduce stray field.

In the charging plate 702 as depicted in FIG. 7, EMF radiation generated by the set of send/receive conductive wires is minimized by virtue of active shielding. In embodiments of the charging plate, active shielding is provided over a first portion of the length of the set of send/receive conductive wires by virtue of being paired and active shielding is provided over a second portion of the length of the set of send/receive conductive wires by virtue of being paired with a portion of the inductive coil below it. The first and second portion of the set of send/receive conductive wires may make up substantially the entirety of the set of send/receive conductive wires.

Figure 8:
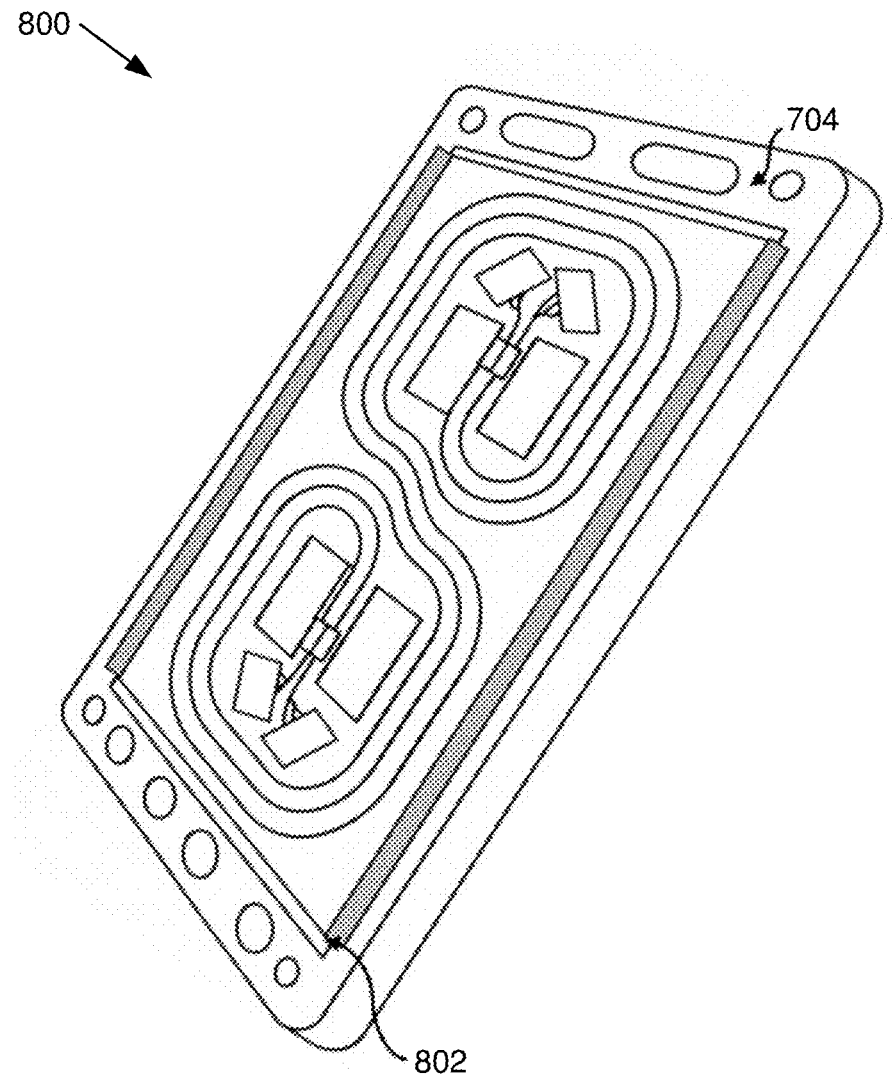
FIG. 8 illustrates an example low-power charging plate that may be implemented in accordance with at least some embodiments.

FIG. 8 illustrates an exemplary low-power charging plate 800 that may be implemented in accordance with embodiments. Similar to the high-power charging plate described above, the charging plate 802 may include an inductive coil 402 as described with respect to FIG. 4 above. Additionally, a set of send/receive conductive wires 502 may be included in the charging plate positioned in a layer that is parallel to, but separate from, a layer that includes the inductive coil. It should be noted that, unlike the high-power charging plate described elsewhere, a low-power charging plate as depicted may include fewer sets of send-receive conductive wires. For example, a low-power charging plate may include a single set of send-receive conductive wires as depicted, rather than multiple sets of send/receive conductive wires.

Similar to the depicted high-power charging plate of FIG. 7, over a second portion of the length of the set of send/receive conductive wires, each of the conductive wires may be paired with a corresponding portion of the inductive coil. The second portion of the set of send/receive conductive wires 502 may be positioned in a manner such that a conductive wire from the set of send/receive conductive wires runs proximate, and parallel, to a conductive wire of the inductive coil layer and which carries an equal and opposite current to reduce stray field.

Figure 9:
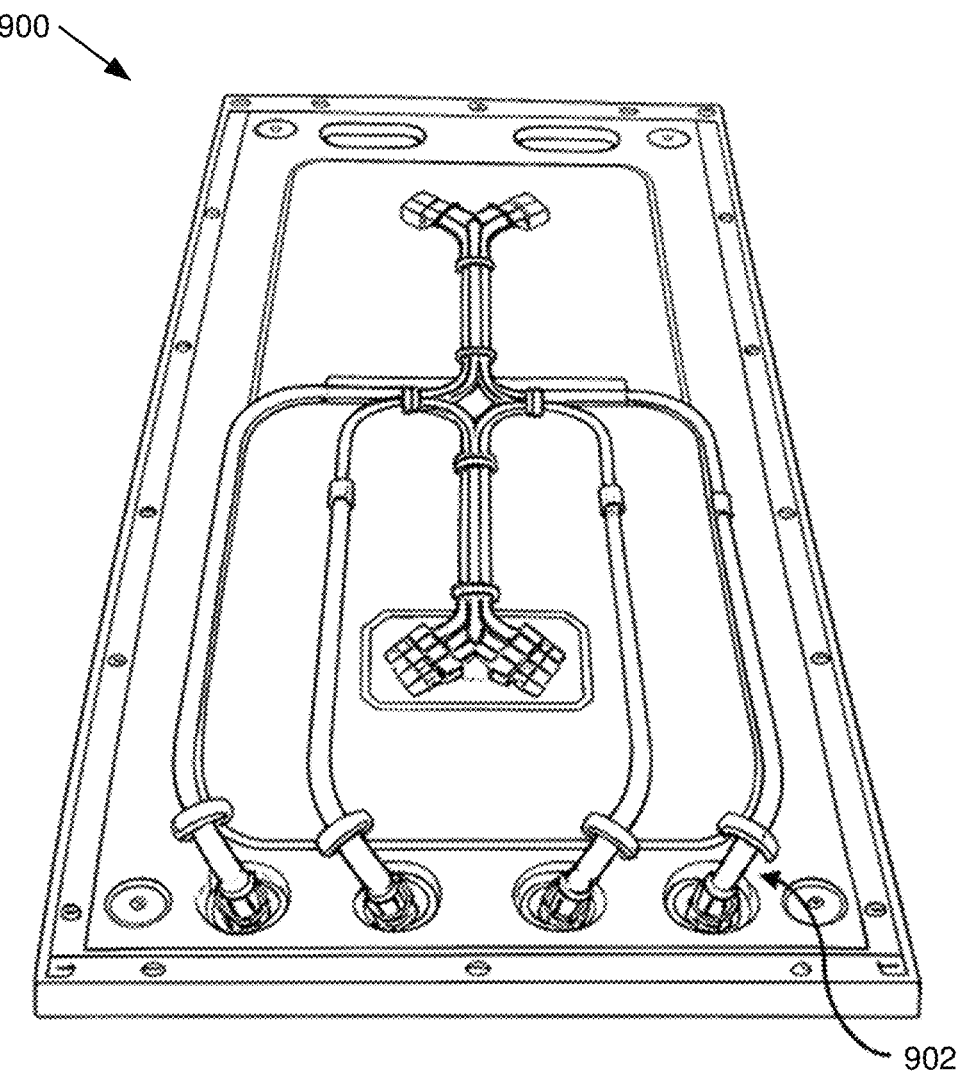
FIG. 9 illustrates another example high-power charging plate that may be implemented in accordance with at least some embodiments.

FIG. 9 illustrates another example high-power charging plate 900 that may be implemented in accordance with at least some embodiments. As described herein with reference to FIG. 5, the high-power charging plate 900 may include multiple sets of send/receive conductive wires such as a set of send/receive conductive wires 902 that run deep into the interior of the plate 900 before diverging to power inductive coils.

Figure 10:
FIG. 10 depicts a flow diagram illustrating an example process for routing conductive wires within a charging plate in order to minimize the emission of radiation from the conductive wires in accordance with at least some embodiments.
Figure 10:
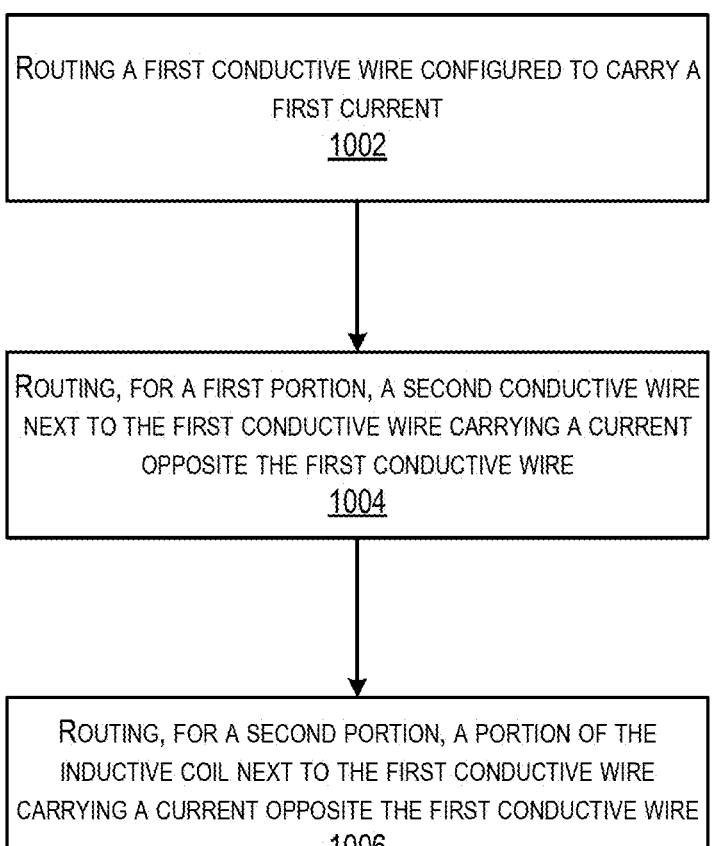

FIG. 10 depicts a flow diagram illustrating a process for routing conductive wires within a charging plate in order to minimize the emission of radiation from the conductive wires in accordance with at least some embodiments. In FIG. 10, the process 1000 is depicted as a series of blocks, each of which represent a step or series of steps in the process.

At 1002, the process 1000 may involve routing a first conductive wire configured to carry a first current to an inductive coil for a length between a power source and a terminal connector. In embodiments, the length of wiring is connected to the inductive coil via the terminal connector. The inductive coil in these embodiments is configured to generate a magnetic field above the power transfer pad. Furthermore, the length of wiring may positioned between the inductive coil and the charging area and may be unshielded from the charging area.

At 1004, the process 1000 may involve routing, for a first portion of the length, a second conductive wire next to the first conductive wire. In embodiments, the second conductive wire carries a second current that runs in the opposite direction of the first current. In some embodiments, the first portion of the length comprises a length of wiring that is routed from a power source to a central area of the charging plate.

At 1006, the process 1000 may involve routing, for a second portion of the length of wiring connected to the terminal connector, a portion of the coil next to the first conductive wire. In these embodiments, the portion of the inductive coil is configured to carry a third current having a direction that is opposite that of the first current.

In embodiments, the first portion of the length of wiring and the second portion of the length of wiring make up substantially the entirety of the length of wiring.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

The invention claimed is:

1. A method of routing conductive wires in a wireless power transfer pad comprising:

routing, for a length of wiring between a power source and a first portion of an inductive coil, a first conductive wire configured to carry a first current, the inductive coil comprising one or more conductive wires shaped into a figure eight pattern with the first portion and a second portion of the inductive coil formed into two loops such that the current in one of the two loops runs clockwise and the current in the other of the two loops runs counterclockwise;

routing, for a first portion of the length of wiring from an edge of the power transfer pad to a central area within the power transfer pad, a second conductive wire next to the first conductive wire, wherein the second conductive wire is configured to carry a second current having a direction that is substantially opposite that of the first current, wherein the central area is centered between the two loops; and routing, for a second portion of the length of wiring, a third conductive wire next to the first conductive wire, wherein the third conductive wire is configured to carry a third current having a direction that is substantially opposite that of the first current, wherein the second portion is from the central area to a split to two terminal connectors of the inductive coil.

2. The method of claim 1, wherein the first portion of the length of wiring and the second portion of the length of wiring make up substantially an entirety of the length of wiring.

3. The method of claim 1, wherein the length of wiring is connected to the inductive coil via a first terminal connector and wherein the second portion of the length of wiring is connected to a second terminal connector.

4. The method of claim 1, wherein the inductive coil is configured to generate a magnetic field above the wireless power transfer pad.

5. The method of claim 1, wherein the length of wiring is positioned between the inductive coil and a charging area above the inductive coil.

6. The method of claim 5, wherein the length of wiring is unshielded from the charging area.

7. The method of claim 1, further comprising routing, for a third portion of the length of wiring between the power source and the inductive coil, a portion of the inductive coil next to the first conductive wire, wherein the portion of the inductive coil is configured to carry a fourth current having a direction that is substantially opposite that of the first current.

8. A power transfer pad comprising:

a first conductive wire configured to carry a first current for a length of wiring between a power source and an inductive coil, the inductive coil comprising one or more conductive wires shaped into a figure eight pattern with two portions formed into two loops such that the current in one of the two loops runs clockwise and the current in the other of the two loops runs counterclockwise;

a second conductive wire routed next to the first conductive wire for a first portion of the length of wiring that runs from an edge of the power transfer pad to a central area within the power transfer pad, wherein the second conductive wire is configured to carry a second current having a direction that is substantially opposite that of the first current, wherein the central area is centered between the two loops; and a third conductive wire routed next to the first conductive wire for a second portion of the length of wiring that runs from the central area within the power transfer pad to a split to two terminal connectors of the inductive coil, wherein the third conductive wire is configured to carry a third current having a direction that is substantially opposite that of the first current.

9. The power transfer pad of claim 8, further comprising a portion of the inductive coil routed next to the first conductive wire for a third portion of the length of wiring, wherein the portion of the inductive coil is configured to carry a fourth current having a direction that is substantially opposite that of the first current.

10. The power transfer pad of claim 9, wherein the length of wiring is connected to the inductive coil via a terminal connector of the two terminal connectors, the terminal connector connected to the portion of the inductive coil.

11. The power transfer pad of claim 8, wherein the inductive coil is configured to generate a magnetic field in a charging area away from the power transfer pad.

12. The power transfer pad of claim 11, wherein the length of wiring is positioned between the inductive coil and the charging area.

13. The power transfer pad of claim 12, wherein the length of wire is unshielded from the charging area.

14. A wiring system comprising:

an inductive coil of a power transfer pad comprising at least one loop of wire that, when powered, is configured to generate a magnetic field within a charging area, wherein the at least one loop of the inductive coil comprising conductors wound in a spiral-type pattern with current in each conductor of the at least one loop flowing in a same direction around the at least one loop;

a terminal connector in electrical contact with the inductive coil; and a set of send and receive wires running a length between a power source and the terminal connector, individual wires in the set of send and receive wires being paired with another wire in the set of send and receive wires over a portion of the length that runs from an edge of the power transfer pad to a central area of the power transfer pad, wherein the central area is centered between the two loops, wherein the individual wires in the send and receive wires paired together comprise a first current in a first direction in a first wire of the send and receive wires paired together and a second current in a second direction substantially opposite the first direction in a second wire of the send and receive wires paired together.

15. The wiring system of claim 14, wherein the length comprises a second portion from the central area to a separation point before the terminal connector.

16. The wiring system of claim 15, wherein the portion of the length of wiring and the second portion of the length of wiring make up substantially the entirety of the length between the power source and the separation point before the terminal connector.

17. The wiring system of claim 14, wherein the set of send and receive wires is positioned between the inductive coil and the charging area.

18. The wiring system of claim 14, wherein a magnetic field generated by the set of send and receive wires is at least partially canceled over the length between the power source and the terminal connector.

19. The wiring system of claim 14, wherein the individual wires in the set of send and receive wire paired over the portion of the length from the edge of the power transfer pad and the central area comprise a first conductive wire and a second conductive wire, and further comprising, for a second portion of the length, a third conductive wire paired with the first conductive wire a length between the central area and a separation point where the first conductive wire and the third conductive wire separate to connect the first conductive wire to the terminal connector and to connect the third conductive wire to connect to a second terminal connector.

20. The wiring system of claim 19, further comprising a portion of a conductor of the inductive coil connected to the terminal connector paired with the first conductive wire over a third portion of the length between the power source and the terminal connector, the third portion of the length that runs between the separation point and the terminal connector.

\* \* \* \* \*